United States Patent
Roddy et al.

(10) Patent No.: US 8,895,486 B2
(45) Date of Patent: Nov. 25, 2014

(54) METHODS AND COMPOSITIONS COMPRISING CEMENT KILN DUST HAVING AN ALTERED PARTICLE SIZE

(75) Inventors: Craig W. Roddy, Duncan, OK (US); Jiten Chatterji, Duncan, OK (US); Chad Brenneis, Marlow, OK (US); Callie R. Jarratt, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/620,013

(22) Filed: Sep. 14, 2012

(65) Prior Publication Data

US 2013/0008352 A1 Jan. 10, 2013

Related U.S. Application Data

(60) Division of application No. 13/477,777, filed on May 22, 2012, which is a division of application No. 13/399,913, filed on Feb. 17, 2012, now Pat. No. 8,281,859, which is a continuation-in-part of application No. 13/180,238, filed on Jul. 11, 2011, now Pat. No. 8,672,028, which is a continuation-in-part of application No. 12/975,196, filed on Dec. 21, 2010, now Pat. No. 8,403,045, said application No. 13/399,913 is a continuation-in-part of application No. 12/895,436, filed on Sep. 30, 2010, now Pat. No. 8,522,873, which is a continuation-in-part of application No. 12/264,010, filed on Nov. 3, 2008, now Pat. No. 8,333,240, which is a continuation-in-part of application No. 11/223,669, filed on Sep. 9, 2005, now Pat. No. 7,445,669.

(51) Int. Cl.
| | | |
|---|---|---|
| *C09C 3/06* | (2006.01) | |
| *C09K 8/84* | (2006.01) | |
| *C04B 7/14* | (2006.01) | |
| *C04B 7/34* | (2006.01) | |
| *E21B 33/13* | (2006.01) | |
| *C04B 18/16* | (2006.01) | |
| *C04B 28/02* | (2006.01) | |
| *C09K 8/03* | (2006.01) | |
| *C09K 8/467* | (2006.01) | |

(52) U.S. Cl.
CPC .............. *E21B 33/13* (2013.01); *C04B 18/162* (2013.01); *C04B 28/02* (2013.01); *C09K 8/032* (2013.01); *C09K 8/467* (2013.01)
USPC ........... 507/269; 166/285; 106/706; 106/638; 106/705; 106/707; 106/789; 106/791; 106/792; 106/793; 106/796

(58) Field of Classification Search
None
See application file for complete search history.

(56) References Cited

U.S. PATENT DOCUMENTS

| | | | |
|---|---|---|---|
| 1,931,921 | A | 10/1933 | Breerwood |
| 2,021,956 | A | 11/1935 | Gladney et al. |
| 2,045,899 | A | 6/1936 | Davis |
| 2,094,316 | A | 9/1937 | Cross et al. |
| 2,133,622 | A | 10/1938 | Larmour et al. |
| 2,144,254 | A | 1/1939 | Breerwood |
| 2,193,775 | A | 3/1940 | Stratford |
| 2,193,807 | A | 3/1940 | Dieterich |
| 2,214,715 | A | 9/1940 | Breerwood |
| 2,329,940 | A | 9/1943 | Ponzer |
| 2,592,468 | A | 4/1952 | Rex et al. |
| 2,772,739 | A | 12/1956 | Arie |
| 2,842,205 | A | 7/1958 | Allen et al. |
| 2,844,361 | A | 7/1958 | Dilcher et al. |
| 2,848,051 | A | 8/1958 | Williams |
| 2,871,133 | A | 1/1959 | Palonen et al. |
| 2,880,096 | A | 3/1959 | Hurley |
| 2,945,769 | A | 7/1960 | Gama et al. |
| 3,024,125 | A | 3/1962 | Lee |
| 3,168,139 | A | 2/1965 | Kennedy et al. |
| 3,320,077 | A | 5/1967 | Prior |
| 3,411,580 | A | 11/1968 | Roberts et al. |
| 3,421,703 | A | 1/1969 | Galer |
| 3,454,095 | A | 7/1969 | Messenger et al. |
| 3,467,193 | A | 9/1969 | Messenger |
| 3,473,939 | A | 10/1969 | Mayberry et al. |
| 3,499,491 | A | 3/1970 | Wyant et al. |

(Continued)

FOREIGN PATENT DOCUMENTS

| | | |
|---|---|---|
| CA | 2064682 | 4/1992 |
| CA | 2336077 | 1/2000 |

(Continued)

OTHER PUBLICATIONS

Office Action from U.S. Appl. No. 13/477,777 dated Oct. 15, 2012.
Notice of Allowance from U.S. Appl. No. 12/844,612 dated Oct. 18, 2012.
Final Office Action from U.S. Appl. No. 12/975,196 dated Oct. 23, 2012.
Office Action from U.S. Appl. No. 13/555,624 dated Oct. 19, 2012.
U.S. Appl. No. 13/622,821, filed Sep. 19, 2012.
U.S. Appl. No. 13/669,149, filed Nov. 5, 2012.

(Continued)

*Primary Examiner* — John J Figueroa
(74) *Attorney, Agent, or Firm* — Craig W. Roddy; Tumey L.L.P.

(57) ABSTRACT

Methods and compositions are disclosed that comprise cement kiln dust having a mean particle size that has been altered. An embodiment discloses a method of preparing cement kiln dust comprising: providing cement kiln dust having an original particle size; and altering the mean particle size of the cement kiln dust from the original size by grinding, separating, or a combination thereof. Another embodiment discloses a well treatment fluid comprising: cement kiln dust having a mean particle size that has been altered from its original size by grinding, separating, or a combination thereof; and water.

30 Claims, No Drawings

(56) References Cited

U.S. PATENT DOCUMENTS

| | | |
|---|---|---|
| 3,557,876 A | 1/1971 | Tragesser |
| 3,574,113 A | 4/1971 | Shannon |
| 3,574,816 A | 4/1971 | Abbdellatif et al. |
| 3,628,973 A | 12/1971 | Greening et al. |
| 3,748,159 A | 7/1973 | George |
| 3,749,173 A | 7/1973 | Hill et al. |
| 3,863,718 A | 2/1975 | Bruist |
| 3,876,005 A | 4/1975 | Fincher et al. |
| 3,887,009 A | 6/1975 | Miller et al. |
| 3,887,385 A | 6/1975 | Quist et al. |
| 3,921,717 A | 11/1975 | Danjushevsky |
| 3,959,007 A | 5/1976 | Pitt |
| 4,018,617 A | 4/1977 | Nicholson |
| 4,031,184 A | 6/1977 | McCord |
| 4,036,301 A | 7/1977 | Powers et al. |
| 4,083,407 A | 4/1978 | Griffin et al. |
| 4,101,332 A | 7/1978 | Nicholson |
| 4,105,459 A | 8/1978 | Mehta |
| 4,141,843 A | 2/1979 | Watson |
| 4,160,674 A | 7/1979 | Sawyer |
| 4,176,720 A | 12/1979 | Wilson |
| 4,268,316 A | 5/1981 | Wills et al. |
| 4,274,881 A | 6/1981 | Langton |
| 4,304,300 A | 12/1981 | Watson |
| 4,333,764 A | 6/1982 | Richardson |
| 4,341,562 A | 7/1982 | Ahlbeck |
| RE31,190 E | 3/1983 | Detroit et al. |
| 4,400,474 A | 8/1983 | Copperthwaite et al. |
| 4,407,677 A | 10/1983 | Wills et al. |
| 4,423,781 A | 1/1984 | Thomas |
| 4,432,800 A | 2/1984 | Kneller et al. |
| 4,435,216 A | 3/1984 | Diehl et al. |
| 4,436,850 A | 3/1984 | Burdick et al. |
| 4,440,576 A | 4/1984 | Flannery et al. |
| 4,460,292 A | 7/1984 | Durham et al. |
| 4,462,835 A | 7/1984 | Car |
| 4,470,463 A | 9/1984 | Holland |
| 4,494,990 A | 1/1985 | Harris |
| 4,515,635 A | 5/1985 | Rao et al. |
| 4,519,452 A | 5/1985 | Tsao et al. |
| 4,555,269 A | 11/1985 | Rao et al. |
| 4,614,599 A | 9/1986 | Walker |
| 4,624,711 A | 11/1986 | Styron |
| 4,633,950 A | 1/1987 | Delhommer et al. |
| 4,676,317 A | 6/1987 | Fry et al. |
| 4,676,832 A | 6/1987 | Childs et al. |
| 4,741,782 A | 5/1988 | Styron |
| 4,784,223 A | 11/1988 | Worrall et al. |
| 4,829,107 A | 5/1989 | Mehta |
| 4,883,125 A | 11/1989 | Wilson et al. |
| 4,941,536 A | 7/1990 | Brothers et al. |
| 4,992,102 A | 2/1991 | Barbour |
| 5,030,366 A | 7/1991 | Wilson et al. |
| 5,049,288 A | 9/1991 | Brothers et al. |
| 5,058,679 A | 10/1991 | Hale et al. |
| RE33,747 E | 11/1991 | Hartley et al. |
| 5,086,850 A | 2/1992 | Harris et al. |
| 5,113,943 A | 5/1992 | Wilson et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,183,505 A | 2/1993 | Spinney |
| 5,183,506 A | 2/1993 | Zhang |
| 5,213,160 A | 5/1993 | Nahm et al. |
| 5,215,585 A | 6/1993 | Luthra et al. |
| 5,238,064 A | 8/1993 | Dahl et al. |
| 5,252,128 A | 10/1993 | Gopalkrishnan |
| 5,266,111 A | 11/1993 | Barbour |
| 5,290,355 A | 3/1994 | Jakel et al. |
| 5,295,543 A | 3/1994 | Terry et al. |
| 5,305,831 A | 4/1994 | Nahm |
| 5,314,022 A | 5/1994 | Cowan et al. |
| 5,316,083 A | 5/1994 | Nahm et al. |
| 5,327,968 A | 7/1994 | Onan et al. |
| 5,337,824 A | 8/1994 | Cowan |
| 5,339,902 A | 8/1994 | Harris |
| 5,346,548 A | 9/1994 | Mehta |
| 5,352,288 A | 10/1994 | Mallow |
| 5,358,044 A | 10/1994 | Hale et al. |
| 5,358,049 A | 10/1994 | Hale et al. |
| 5,361,841 A | 11/1994 | Hale et al. |
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |
| 5,382,290 A | 1/1995 | Nahm et al. |
| 5,383,521 A | 1/1995 | Onan et al. |
| 5,383,967 A | 1/1995 | Chase |
| 5,398,758 A | 3/1995 | Onan et al. |
| 5,417,759 A | 5/1995 | Huddleston |
| 5,421,409 A | 6/1995 | Mueller et al. |
| 5,423,379 A | 6/1995 | Hale et al. |
| 5,430,235 A | 7/1995 | Hooykaas et al. |
| 5,439,056 A | 8/1995 | Cowan |
| 5,456,751 A | 10/1995 | Zandi et al. |
| 5,458,195 A | 10/1995 | Totten et al. |
| 5,464,060 A | 11/1995 | Hale et al. |
| 5,472,051 A | 12/1995 | Brothers |
| 5,476,144 A | 12/1995 | Nahm et al. |
| 5,478,391 A | 12/1995 | Babaev et al. |
| 5,484,019 A | 1/1996 | Griffith |
| 5,494,513 A | 2/1996 | Fu et al. |
| 5,499,677 A | 3/1996 | Cowan |
| 5,515,921 A | 5/1996 | Cowan et al. |
| 5,518,996 A | 5/1996 | Maroy et al. |
| 5,520,730 A | 5/1996 | Barbour |
| 5,529,123 A | 6/1996 | Carpenter et al. |
| 5,529,624 A | 6/1996 | Riegler |
| 5,536,311 A | 7/1996 | Rodrigues |
| 5,542,782 A | 8/1996 | Carter et al. |
| 5,554,352 A | 9/1996 | Jaques et al. |
| 5,569,324 A | 10/1996 | Totten et al. |
| 5,580,379 A | 12/1996 | Cowan |
| 5,584,926 A | 12/1996 | Borgholm et al. |
| 5,585,333 A | 12/1996 | Dahl et al. |
| 5,588,489 A | 12/1996 | Chatterji et al. |
| 5,626,665 A | 5/1997 | Barger et al. |
| 5,641,584 A | 6/1997 | Andersen et al. |
| 5,673,753 A | 10/1997 | Hale et al. |
| 5,681,384 A | 10/1997 | Liskowitz |
| 5,688,844 A | 11/1997 | Chatterji et al. |
| 5,711,383 A | 1/1998 | Terry et al. |
| 5,716,910 A | 2/1998 | Totten et al. |
| 5,728,654 A | 3/1998 | Dobson et al. |
| 5,788,762 A | 8/1998 | Barger et al. |
| 5,795,924 A | 8/1998 | Chatterji et al. |
| 5,820,670 A | 10/1998 | Chatterji et al. |
| 5,851,960 A | 12/1998 | Totten et al. |
| 5,866,516 A | 2/1999 | Costin |
| 5,866,517 A | 2/1999 | Carpenter et al. |
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 6,022,408 A | 2/2000 | Stokes et al. |
| 6,060,434 A | 5/2000 | Sweatman et al. |
| 6,060,535 A | 5/2000 | Villar et al. |
| 6,063,738 A | 5/2000 | Chatterji et al. |
| 6,098,711 A | 8/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 | 5/2001 | Muller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,264,738 B1 | 7/2001 | Lorke et al. |
| 6,277,189 B1 | 8/2001 | Chugh |
| 6,312,515 B1 | 11/2001 | Barlet-Gouedard et al. |

(56) References Cited

U.S. PATENT DOCUMENTS

| | | |
|---|---|---|
| 6,315,042 B1 | 11/2001 | Griffith et al. |
| 6,328,106 B1 | 12/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,402,833 B1 | 6/2002 | O'Hearn et al. |
| 6,409,819 B1 | 6/2002 | Ko |
| 6,416,574 B1 | 7/2002 | Steelhammer |
| 6,451,104 B2 | 9/2002 | Mehta |
| 6,457,524 B1 | 10/2002 | Roddy et al. |
| 6,478,869 B2 | 11/2002 | Reddy et al. |
| 6,488,763 B2 | 12/2002 | Brothers et al. |
| 6,488,764 B2 | 12/2002 | Westerman |
| 6,494,951 B1 | 12/2002 | Reddy et al. |
| 6,500,252 B1 | 12/2002 | Chatterji et al. |
| 6,502,634 B1 | 1/2003 | Evans et al. |
| 6,508,305 B1 | 1/2003 | Brannon et al. |
| 6,516,884 B1 | 2/2003 | Chatterji et al. |
| 6,524,384 B2 | 2/2003 | Griffith et al. |
| 6,547,871 B2 | 4/2003 | Chatterji et al. |
| 6,547,891 B2 | 4/2003 | Linden et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,610,139 B2 | 8/2003 | Reddy et al. |
| 6,626,243 B1 | 9/2003 | Go Boncan |
| 6,641,658 B1 | 11/2003 | Dubey |
| 6,645,289 B2 | 11/2003 | Sobolev |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,927 B1 | 12/2003 | Chatterji et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,708,760 B1 | 3/2004 | Chatterji et al. |
| 6,715,568 B1 | 4/2004 | Bailey |
| 6,716,282 B2 | 4/2004 | Griffith et al. |
| 6,729,405 B2 | 5/2004 | DiLullo et al. |
| 6,749,679 B2 | 6/2004 | Shi |
| 6,755,905 B2 | 6/2004 | Oates |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,823,940 B2 | 11/2004 | Reddy et al. |
| 6,832,652 B1 | 12/2004 | Dillenbeck et al. |
| 6,835,243 B2 | 12/2004 | Brothers et al. |
| 6,837,316 B2 | 1/2005 | Reddy et al. |
| 6,840,318 B2 | 1/2005 | Lee |
| 6,846,357 B2 | 1/2005 | Reddy et al. |
| 6,848,519 B2 | 2/2005 | Reddy et al. |
| 6,869,474 B2 | 3/2005 | Perez-Pena et al. |
| 6,869,475 B1 | 3/2005 | Krowl |
| 6,874,578 B1 | 4/2005 | Garnier |
| 6,883,609 B2 | 4/2005 | Drochon |
| 6,887,833 B2 | 5/2005 | Brothers et al. |
| 6,889,767 B2 | 5/2005 | Reddy et al. |
| 6,904,971 B2 | 6/2005 | Brothers et al. |
| 6,908,508 B2 | 6/2005 | Brothers |
| 6,911,078 B2 | 6/2005 | Barlet-Gouedard et al. |
| 7,022,755 B1 | 4/2006 | Chatterji et al. |
| 7,048,053 B2 | 5/2006 | Santra et al. |
| 7,077,203 B1 | 7/2006 | Roddy et al. |
| 7,096,944 B2 | 8/2006 | Vargo et al. |
| 7,101,829 B2 | 9/2006 | Guichard |
| 7,174,962 B1 | 2/2007 | Roddy et al. |
| 7,182,137 B2 | 2/2007 | Fyten et al. |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,213,646 B2 | 5/2007 | Roddy et al. |
| 7,284,609 B2 | 10/2007 | Roddy et al. |
| 7,285,164 B2 | 10/2007 | Luke et al. |
| 7,303,015 B2 | 12/2007 | Fyten |
| 7,325,611 B2 | 2/2008 | Santra et al. |
| 7,335,252 B2 | 2/2008 | Roddy et al. |
| 7,337,842 B2 | 3/2008 | Roddy et al. |
| 7,338,923 B2 | 3/2008 | Roddy et al. |
| 7,341,104 B2 | 3/2008 | Roddy et al. |
| 7,341,105 B2 | 3/2008 | Bingamon |
| 7,350,573 B2 | 4/2008 | Reddy |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,395,860 B2 | 7/2008 | Roddy et al. |
| 7,404,855 B2 | 7/2008 | Chatterji et al. |
| 7,409,990 B1 | 8/2008 | Burts et al. |
| 7,445,669 B2 | 11/2008 | Roddy et al. |
| 7,478,675 B2 | 1/2009 | Roddy et al. |
| 7,607,482 B2 | 10/2009 | Roddy et al. |
| 7,607,484 B2 | 10/2009 | Roddy et al. |
| 7,627,870 B1 | 12/2009 | Michaeli et al. |
| 7,631,692 B2 | 12/2009 | Roddy et al. |
| 7,655,088 B2 | 2/2010 | Bethani |
| 7,674,332 B2 | 3/2010 | Roddy et al. |
| 7,741,841 B2 | 6/2010 | Edwards et al. |
| 7,743,828 B2 | 6/2010 | Roddy et al. |
| 7,784,542 B2 | 8/2010 | Roddy et al. |
| 7,789,150 B2 | 9/2010 | Roddy et al. |
| 7,815,880 B2 | 10/2010 | Constantz et al. |
| 7,867,954 B2 | 1/2011 | Warrender et al. |
| 7,922,809 B1 | 4/2011 | Constantz et al. |
| 7,927,419 B2 | 4/2011 | Roddy |
| 8,006,446 B2 | 8/2011 | Constantz et al. |
| 8,029,618 B2 | 10/2011 | Al-Shafei |
| 8,030,253 B2 | 10/2011 | Roddy et al. |
| 8,039,253 B2 | 10/2011 | Asou |
| 8,062,999 B2 | 11/2011 | Reddy et al. |
| 8,143,198 B2 | 3/2012 | Lewis et al. |
| 8,261,827 B2 | 9/2012 | Roddy |
| 8,281,859 B2 | 10/2012 | Roddy |
| 8,297,357 B2 | 10/2012 | Brenneis |
| 8,307,899 B2 | 11/2012 | Brenneis |
| 8,318,642 B2 | 11/2012 | Roddy |
| 8,327,939 B2 | 12/2012 | Roddy |
| 8,333,240 B2 | 12/2012 | Roddy |
| 8,394,744 B2 | 3/2013 | Woytowich et al. |
| 8,399,387 B2 | 3/2013 | Roddy |
| 8,403,045 B2 | 3/2013 | Brenneis et al. |
| 8,434,553 B2 | 5/2013 | Brenneis et al. |
| 8,440,596 B2 | 5/2013 | Brenneis et al. |
| 8,486,868 B2 | 7/2013 | Brenneis et al. |
| 8,486,869 B2 | 7/2013 | Brenneis et al. |
| 8,522,873 B2 | 9/2013 | Benkley et al. |
| 8,544,543 B2 | 10/2013 | Chatterji et al. |
| 8,551,923 B1 | 10/2013 | Benkley et al. |
| 8,554,543 B2 | 10/2013 | Cherepanov et al. |
| 8,555,967 B2 | 10/2013 | Chatterji et al. |
| 8,672,028 B2 | 3/2014 | Karcher et al. |
| 8,691,737 B2 | 4/2014 | Chatterji et al. |
| 2002/0033121 A1 | 3/2002 | Marko |
| 2002/0073897 A1 | 6/2002 | Trato |
| 2002/0117090 A1 | 8/2002 | Ku |
| 2003/0116065 A1 | 6/2003 | Griffith et al. |
| 2003/0116887 A1 | 6/2003 | Scott |
| 2003/0167970 A1 | 9/2003 | Polston |
| 2004/0007162 A1 | 1/2004 | Morioka et al. |
| 2004/0040475 A1 | 3/2004 | De La Roij et al. |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0129181 A1 | 7/2004 | Lalande et al. |
| 2004/0182577 A1 | 9/2004 | Chatterji et al. |
| 2004/0187740 A1 | 9/2004 | Timmons |
| 2004/0188091 A1 | 9/2004 | Luke et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |

(56) References Cited

U.S. PATENT DOCUMENTS

| | | |
|---|---|---|
| 2004/0244977 A1 | 12/2004 | Luke et al. |
| 2004/0256102 A1 | 12/2004 | Trato |
| 2004/0262000 A1 | 12/2004 | Morgan et al. |
| 2005/0000734 A1 | 1/2005 | Getzlaf et al. |
| 2005/0034867 A1 | 2/2005 | Griffith et al. |
| 2005/0056191 A1 | 3/2005 | Brothers et al. |
| 2005/0061505 A1 | 3/2005 | Caveny et al. |
| 2005/0072599 A1 | 4/2005 | Luke et al. |
| 2005/0077045 A1 | 4/2005 | Chatterji et al. |
| 2005/0084334 A1 | 4/2005 | Shi et al. |
| 2005/0098317 A1 | 5/2005 | Reddy et al. |
| 2005/0133221 A1 | 6/2005 | Chatterji et al. |
| 2005/0205255 A1 | 9/2005 | Gagliano et al. |
| 2006/0025312 A1 | 2/2006 | Santra et al. |
| 2006/0054319 A1 | 3/2006 | Fyten |
| 2006/0065399 A1 | 3/2006 | Luke et al. |
| 2006/0081372 A1 | 4/2006 | Dealy et al. |
| 2006/0086499 A1 | 4/2006 | Badalamenti et al. |
| 2006/0166834 A1 | 7/2006 | Roddy |
| 2006/0175060 A1 | 8/2006 | Reddy |
| 2006/0213397 A1 | 9/2006 | Bethani |
| 2006/0260512 A1 | 11/2006 | Nordmeyer |
| 2007/0056475 A1 | 3/2007 | Roddy et al. |
| 2007/0056479 A1 | 3/2007 | Gray |
| 2007/0056732 A1* | 3/2007 | Roddy et al. ............. 166/292 |
| 2007/0089643 A1 | 4/2007 | Roddy et al. |
| 2007/0102157 A1 | 5/2007 | Roddy et al. |
| 2007/0137528 A1 | 6/2007 | LeRoy-Delage et al. |
| 2007/0186820 A1 | 8/2007 | O'Hearn |
| 2007/0289744 A1 | 12/2007 | Bingamon et al. |
| 2008/0092780 A1 | 4/2008 | Bingamon et al. |
| 2008/0156491 A1 | 7/2008 | Roddy et al. |
| 2008/0229979 A1 | 9/2008 | Lewis |
| 2008/0236814 A1 | 10/2008 | Roddy |
| 2008/0300149 A1 | 12/2008 | Reddy et al. |
| 2009/0044726 A1 | 2/2009 | Brouillette et al. |
| 2009/0105099 A1 | 4/2009 | Warrender et al. |
| 2009/0120644 A1 | 5/2009 | Roddy et al. |
| 2009/0124522 A1 | 5/2009 | Roddy et al. |
| 2009/0145601 A1 | 6/2009 | Bailey et al. |
| 2009/0169452 A1 | 7/2009 | Constantz et al. |
| 2009/0200029 A1 | 8/2009 | Roddy et al. |
| 2009/0202410 A1 | 8/2009 | Kawatra et al. |
| 2009/0266543 A1 | 10/2009 | Roddy et al. |
| 2009/0308611 A1 | 12/2009 | Santra et al. |
| 2009/0312445 A1 | 12/2009 | Roddy et al. |
| 2009/0320720 A1 | 12/2009 | Roddy et al. |
| 2010/0025039 A1 | 2/2010 | Roddy et al. |
| 2010/0041792 A1 | 2/2010 | Roddy et al. |
| 2010/0044043 A1 | 2/2010 | Roddy et al. |
| 2010/0044057 A1 | 2/2010 | Dealy et al. |
| 2010/0051266 A1 | 3/2010 | Roddy et al. |
| 2010/0051275 A1 | 3/2010 | Lewis et al. |
| 2010/0077922 A1 | 4/2010 | Constantz et al. |
| 2010/0081584 A1 | 4/2010 | Perez |
| 2010/0196104 A1 | 8/2010 | Constantz et al. |
| 2010/0258035 A1 | 10/2010 | Constantz et al. |
| 2010/0258312 A1 | 10/2010 | Brenneis et al. |
| 2010/0273912 A1 | 10/2010 | Roddy et al. |
| 2010/0282466 A1 | 11/2010 | Brenneis et al. |
| 2010/0292365 A1 | 11/2010 | Roddy et al. |
| 2010/0294496 A1* | 11/2010 | Woytowich et al. ........ 166/285 |
| 2010/0313793 A1 | 12/2010 | Constantz et al. |
| 2011/0000400 A1 | 1/2011 | Roddy |
| 2011/0017452 A1 | 1/2011 | Benkley |
| 2011/0100626 A1 | 5/2011 | Brenneis |
| 2011/0297378 A1 | 12/2011 | Reddy et al. |
| 2012/0012315 A1 | 1/2012 | Woytowich |
| 2012/0145387 A1 | 6/2012 | Pyatina et al. |
| 2012/0145393 A1 | 6/2012 | Roddy |
| 2012/0152539 A1 | 6/2012 | Karcher |
| 2012/0193097 A1 | 8/2012 | Roddy |
| 2012/0227631 A1 | 9/2012 | Roddy |
| 2012/0234541 A1 | 9/2012 | Roddy |
| 2012/0267107 A1 | 10/2012 | Benkley et al. |
| 2012/0285682 A1 | 11/2012 | Santra et al. |
| 2012/0291674 A1 | 11/2012 | Brenneis et al. |
| 2012/0318506 A1 | 12/2012 | Benkley et al. |
| 2012/0325119 A1 | 12/2012 | Brenneis et al. |
| 2012/0325476 A1 | 12/2012 | Brenneis et al. |
| 2012/0325477 A1 | 12/2012 | Brenneis et al. |
| 2012/0328377 A1 | 12/2012 | Brenneis et al. |
| 2013/0008352 A1 | 1/2013 | Roddy et al. |
| 2013/0048286 A1 | 2/2013 | Morgan et al. |
| 2013/0061779 A1 | 3/2013 | Brenneis |
| 2013/0112405 A1 | 5/2013 | Chatterji et al. |
| 2013/0118752 A1 | 5/2013 | Hannegan et al. |
| 2013/0126159 A1 | 5/2013 | Bryan et al. |
| 2013/0153214 A1 | 6/2013 | Roddy et al. |
| 2013/0157903 A1 | 6/2013 | Benkley et al. |
| 2013/0213642 A1 | 8/2013 | Chatterji et al. |
| 2013/0213643 A1 | 8/2013 | Chatterji et al. |
| 2013/0233538 A1 | 9/2013 | Chatterji et al. |
| 2013/0244911 A1 | 9/2013 | Benkley et al. |
| 2014/0048266 A1 | 2/2014 | Morgan et al. |
| 2014/0060389 A1 | 3/2014 | Chatterji et al. |
| 2014/0076204 A1 | 3/2014 | Brenneis et al. |
| 2014/0123879 A1 | 5/2014 | Karcher et al. |

FOREIGN PATENT DOCUMENTS

| | | |
|---|---|---|
| CA | 2153372 | 1/2006 |
| CN | 97105827.X | 7/2000 |
| EP | 0814067 | 12/1997 |
| EP | 1092693 | 4/2001 |
| EP | 1236701 | 9/2002 |
| EP | 1394137 | 7/2003 |
| EP | 1348831 | 10/2003 |
| EP | 1900703 | 3/2008 |
| EP | 2075303 | 7/2009 |
| GB | 1469954 | 4/1997 |
| GB | 2455446 | 6/2009 |
| WO | WO 83/01443 | 9/1982 |
| WO | 93/21122 | 10/1993 |
| WO | 97/21637 | 6/1997 |
| WO | WO 98/54108 | 12/1998 |
| WO | WO 00/63134 | 1/2000 |
| WO | WO 03/031364 | 4/2003 |
| WO | WO 2004/101951 | 11/2004 |
| WO | WO 2004/101952 | 11/2004 |
| WO | WO 2005/047212 | 5/2005 |
| WO | WO 2005/061846 | 7/2005 |
| WO | WO 2006/032841 | 3/2006 |
| WO | 2006/074946 | 7/2006 |
| WO | WO 2007/028952 | 3/2007 |
| WO | 2007/041841 | 4/2007 |
| WO | WO 2007/048999 | 5/2007 |
| WO | WO 2007/128945 | 11/2007 |
| WO | 2009/071962 | 11/2009 |
| WO | WO 2009/138747 | 11/2009 |
| WO | 2010086592 | 8/2010 |
| WO | 2011051664 | 5/2011 |
| WO | 2012/001343 | 1/2012 |

OTHER PUBLICATIONS

Office Action from USPTO for U.S. Appl. No. 13/431,701 dated Nov. 9, 2012.
Office Action from USPTO for U.S. Appl. No. 13/620,163 dated Nov. 9, 2012.
International Search Report and Written Opinion for PCT/US2012/046117 dated Oct. 26, 2012.
Office Action from USPTO for U.S. Appl. No. 13/669,149 dated Dec. 19, 2012.
Office Action from USPTO for U.S. Appl. No. 13/606,098 dated Dec. 13, 2012.
HES Brochure "Micro Matrix® Cement" dated Nov. 2006.
U.S. Appl. No. 13/535,145, filed Jun. 27, 2012, Benkley et al.
U.S. Appl. No. 13/560,406, filed Jul. 27, 2012, Brenneis et al.
U.S. Appl. No. 13/595,493, filed Aug. 27, 2012, Benkley.
U.S. Appl. No. 13/605,875, filed Sep. 6, 2012, Brenneis.
U.S. Appl. No. 13/606,098, filed Sep. 7, 2012, Brenneis.
U.S. Appl. No. 13/606,120, filed Sep. 7, 2012, Brenneis.

(56) References Cited

OTHER PUBLICATIONS

U.S. Appl. No. 13/620,013, filed Sep. 14, 2012, Roddy.
U.S. Appl. No. 13/620,163, filed Sep. 14, 2012, Roddy.
U.S. Appl. No. 13/622,821, filed Sep. 19, 2012, Brenneis.
Bartlet-Gouedard, "A Non-Conventional Way of Developing Cement Slurry for Geothermal Wells", 2001.
Poon, "A Study of the Hydration of Natural Zeolite Blended Cement Pastes", 1999.
"Beneficial use of Solid Waste in Maine", Apr. 14, 2005.
Smith, "Cementing" Society of Petroleum Engineers, p. 38, 1990.
Smith, "Cementing" Society of Petroleum Engineers, pp. 14, 38, 1987.
Chan, Comparative Study of the Initial Surface Absorption and Chloride Diffusion of High Performance Zeolite Silica Fume and PFA concretes, 1999.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Ding, "Extreme Vertices Design of Concrete With Combined Mineral Admixtures", 1999.
"Kiln Dusts", Apr. 14, 2005.
Sersale, "Portland-Zeolite-Cement for Minimizing Alkali-Aggregate Expansion", 1987.
"Standards for the Management of Cement Kiln Dust Waste", Apr. 14, 2005.
Naiqian, "Study on the Suppression Effect of Natural Zeolite on Expansion of Concrete Due to Alkali-Aggregate Reaction", 1998.
Janotka, "The Properties of Mortar Using Blends With Portland Cement Clinker, Zeolite Tuff and Gypsum", 1995.
Herndon, "Setting Downhole Plugs: A State-of-the-Art", Petroleum Engineer International, Apr. 1978.
Sugama, "Hot Alkali Carbonation of Sodium Metaphosphate Modified Fly Ash/Calcium Aluminate Blend Hydrothermal Cements", pp. 1661-1672, Sep. 11, 1996.
"Use of Cement Kiln Dust for the Stabilization of Soils", R. L. Parsons, et al., Apr. 14, 2005.
Feng, "Zeolite Ceramiste Cellular Concrete", 2000.
Marfil, "Zeolite Crystallization in Portland Cement Concrete Due to Alkali-Aggregate Reaction", 1993.
Atkins, "Zeolite P In Cements", "Its Potential for Immobilizing Toxic and Radioactive Waste Species", 1995.
HES Brochure "AQF-2 Foaming Agent", 1999.
HES Brochure "Halad-23 Fluid Loss Additive", 2000.
HES Brochure "Halad-344 Fluid Loss Additive", 1998.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder", 1999.
HES Brochure "HR-4 Cement Retarder", 1999.
HES Brochure "HR-5 Cement Additive", 1998.
HES Brochure "HR-7 Cement Retarder", 1999.
HES Brochure "Pozmix a Cement Additive", 1999.
HES Brochure "SCR-100 Cement Retarder a Valuable Time Saver", 1994.
HES Brochure "SCR-100 Cement Retarder", 1999.
HES Brochure "SCR-500L High Temp Retarder", 2000.
HES Brochure "ThermaLock™ Cement for Corrosive $CO_2$ Environments", 1999.
"3M Scotchlite, Glass Bubbles Floated Product Series Product Information", 1999.
"API Specification for Materials and Testing for Well Cements", API Spec. 10, 5th ed., pp. 7, 19-21, Jul. 1, 1980.
"Appendix A", API RP 13B-2, 2d ed.; pp. 6-8, Dec. 1, 1991.
LAFARGE brochure "TerraCem™", Aug. 2006.
LAFARGE MSDS "Cement Kiln Dust", Mar. 3, 2005.
LAFARGE MSDS "LaFarge Blended Cement (cement)", Mar. 3, 2005.
TXI Material Safety Data Sheet for Pressur-Seal, Oct. 2003.
"Manufacture of supplementary cementitious materials from cement kiln dust", Mishulovich et al., World Cement Research and Development, p. 116-120, Mar. 1996.
"Alkali-activated binders by use of industrial by-products", Buchwald et al., Cement and concrete Research 35, p. 968-973, 2005.
Answer 3 of 24 Chemical Abstracts on STN "Effect of cement kiln dust substitution on chemical and physical properties and compressive strength of Portland and slag cements", Adb El-aleem et al. (abstract only), 2005.
Adaska and Taubert, "Beneficial Uses of Cement Kiln Dust", 2008 IEEE/PCA 50th Cement Industry Technical Conference, Miami, FL, May 19-22, 2008, pp. 1-19, 2008.
Nelson, "Well Cementing", 1990.
"Fly Ash Resource Center-Pozzolan," available at http://www.rmajko.com/pozzolan.htm, Apr. 20, 2009.
HES Brochure "Enhancer 923™ Cement Agent", 2010.
HES Brochure "Enhancer 923™ Agent—Successes from the Field", 2010.
Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431 (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.
Office Action from U.S. Appl. No. 11/223,703, Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May 29, 2007.
Office Action from U.S. Appl. No. 11/223,669, Jun. 18, 2007.
Office Action from U.S. Appl. No. 11/257,261, Aug. 10, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/402,741, Oct. 24, 2007.
Office Action from U.S. Appl. No. 11/223,669, Jan. 29, 2008.
Office Action from U.S. Appl. No. 11/223,669, Apr. 8, 2008.
Office Action from U.S. Appl. No. 12/263,800, May 1, 2009.
Office Action from U.S. Appl. No. 12/283,398, Jul. 15, 2009.
Office Action from U.S. Appl. No. 12/263,800, Jul. 28, 2009.
Office Action from U.S. Appl. No. 12/420,630, Aug. 3, 2009.
Office Action from U.S. Appl. No. 12/349,676, Nov. 4, 2009.
Office Action from U.S. Appl. No. 12/606,381, Mar. 23, 2010.
Office Action from U.S. Appl. No. 12/609,993, Apr. 9, 2010.
Office Action from U.S. Appl. No. 12/609,993, Jun. 15, 2010.
Office Action from U.S. Appl. No. 12/558,097, Jun. 30, 2010.
Notice of Allowance from U.S. Appl. No. 12/609,993, Jul. 26, 2010.
Office Action from U.S. Appl. No. 12/558,097, Sep. 3, 2010.
Office Action from U.S. Appl. No. 12/844,612, Oct. 1, 2010.
Office Action from U.S. Appl. No. 12/544,915, Aug. 1, 2011.
Office Action from U.S. Appl. No. 12/844,612, Sep. 6, 2011.
Office Action from U.S. Appl. No. 12/264,010, Oct. 31, 2011.
Office Action from U.S. Appl. No. 12/844,612, Dec. 23, 2011.
Final Office Action from U.S. Appl. No. 12/264,010, Apr. 10, 2012.
Office Action from U.S. Appl. No. 12/844,612, Apr. 11, 2012.
Office Action from U.S. Appl. No. 13/399,913, May 15, 2012.
Office Action from U.S. Appl. No. 13/447,560, May 31, 2012.
Office Action from U.S. Appl. No. 12/821,412, Jun. 5, 2012.
Office Action from U.S. Appl. No. 12/825,004, Jun. 14, 2012.
Notice of Allowance from U.S. Appl. No. 13/447,560, Jun. 21, 2012.
Office action from U.S. Appl. No. 13/479,476, Jul. 2, 2012.

(56) References Cited

OTHER PUBLICATIONS

Office action from U.S. Appl. No. 12/975,196, Jul. 3, 2012.
Final Office Action from U.S. Appl. No. 12/844,612, Jul. 30, 2012.
Notice of Allowance from U.S. Appl. No. 13/399,913, Aug. 23, 12.
Notice of Allowance from U.S. Appl. No. 13/535,258, Aug. 7, 2012.
Notice of Allowance from U.S. Appl. No. 12/825,004, Aug. 20, 2012.
Foreign Search Report from PCT/GB2005/001415, Sep. 9, 2005.
Foreign Search Report from PCT/GB2006/000406, Jul. 5, 2006.
Foreign Search Report from PCT/GB2006/003163, Oct. 27, 2006.
Foreign Search Report from PCT/GB2006/003160, Nov. 2, 2006.
Foreign Search Report from PCT/GB2006/003735, Dec. 1, 2006.
Foreign Search Report from PCT/GB2006/003694, Dec. 19, 2006.
Foreign Search Report from PCT/GB2006/000401, May 8, 2007.
Foreign Search Report from PCT/GB2009/000295, Feb. 3, 2009.
Foreign Search Report from PCT/GB2009/000295, Jul. 30, 2009.
EPO Application No. 06794648.3 Examination Report, Apr. 17, 2009.
EPO Application No. 06779194.7 Examination Report, May 29, 2009.
PCT International Search Report and Written Opinion for International Application No. PCT/GB2009/000295, Jul. 30, 2009.
PCT International Search Report and Written Opinion for International Application No. PCT/GB2009/002597, Feb. 1, 2010.
PCT International Search Report and Written Opinion for International Application No. PCT/GB2009/002598, Feb. 11, 2010.
PCT International Search Report and Written Opinion for International Application No. PCT/GB2009/000295, Aug. 24, 2010.
PCT International Search Report and Written Opinion for International Application No. PCT/GB2010/001986, Jan. 19, 2011.
PCT International Search Report and Written Opinion for International Application No. PCT/GB2010/002011, Feb. 4, 2011.
PCT International Search Report and Written Opinion for International Application No. PCT/GB2009/002018, Mar. 24, 2011.
PCT International Search Report and Written Opinion for International Application No. PCT/GB2011/000933, Sep. 22, 2011.
PCT International Search Report and Written Opinion for International Application No. PCT/GB2011/001411, Jan. 27, 2012.
English language translation of USSR Patent No. RU 2026959, Jan. 20, 1995.
English language translation of Foreign Office Action for Application No. RU2008113765, Jul. 6, 2009.
English language translation of Chinese Application No. 200680042014.3, Dec. 1, 2010.
Foreign Office Action for Canadian Patent Application No. 2621835, Oct. 2, 2009.
Foreign Office Action for Canadian Patent Application No. 2621832, Oct. 5, 2009.
Foreign Office Action for Canadian Patent Application No. 2650630, Oct. 14, 2010.
Foreign Office Action for Canadian Patent Application No. 2658155, Nov. 16, 2010.
Foreign Office Action for Canadian Patent Application No. 2736148, May 29, 2012.
Foreign Office Action for CN Patent Application No. 200680042004.X, May 12, 2010.
Foreign Office Action for EP Application No. 06 779 199.6, Mar. 1, 2010.
Foreign Office Action for EP Application No. 06 779 191.3, Mar. 31, 2010.
Foreign Office Action for EP Application No. 06 779 194.7, Jul. 2, 2010.
Foreign Office Action for EP Application No. 06 794 646.7, Sep. 24, 2010.
Foreign Office Action for EP Application No. 09 713 469.6, Sep. 28, 2010.
Foreign Office Action for RU Application No. 2008113766, Jul. 14, 2009.
Foreign Office Action for RU Application No. 2008113766, Apr. 8, 2010.
U.S. Appl. No. 13/767,710 (Benkley et al.) filed Feb. 14, 2013.
U.S. Appl. No. 13/851,391 (Chatterji et al.) filed Mar. 27, 2013.
U.S. Appl. No. 13/851,475 (Chatterji et al.) filed Mar. 27, 2013.
U.S. Appl. No. 13/851,925 (Chatterji et al.) filed Mar. 27, 2013.
U.S. Appl. No. 13/725,833 (Chatterji et al.) filed Dec. 21, 2012.
Office Action for U.S. Appl. No. 13/725,833 (Chatterji et al.) mailing date: Apr. 10, 2013.
International Search Report for PCT/GB2011/001749 dated Apr. 5, 2012.
International Search Report and Written Opinion for PCT/GB2010/000712 dated Jul. 26, 2010.
Office Action for U.S. Appl. No. 13/560,406 dated Oct. 17, 2012.
U.S. Appl. No. 13/872,063 (Chatterji et al.) filed Apr. 23, 2013.
U.S. Appl. No. 13/889,398 (Benkley et al.) filed May 8, 2013.
U.S. Appl. No. 13/872,063 (Chatterji et al.) filed Apr. 26, 2013.
Notice of Allowance, U.S. Appl. No. 13/669,149 (Brenneis et al.) mailed May 13, 2013.
USPTO Office Action for U.S. Appl. No. 13/477,777 dated May 29, 2013.
Notice of Allowance for U.S. Appl. No. 13/889,398 dated Aug. 20, 2013.
Notice of Allowance for U.S. Appl. No. 13/851,391 dated Jul. 31, 2013.
Notice of Allowance for U.S. Appl. No. 13/560,406 dated May 29, 2013.
Notice of Allowance for U.S. Appl. No. 12/895,436 dated May 28, 2013.
Notice of Allowance for U.S. Appl. No. 13/535,145 dated May 24, 2013.
USPTO Office Action for U.S. Appl. No. 13/851,925 dated Jun. 2, 2013.
USPTO Office Action for U.S. Appl. No. 13/851,391 dated Jul. 3, 2013.
USPTO Office Action for U.S. Appl. No. 13/889,398 dated Jun. 20, 2013.
USPTO Office Action for U.S. Appl. No. 13/872,063 dated Jul. 12, 2013.
USPTO Office Action for U.S. Appl. No. 13/767,710 dated Jul. 19, 2013.
Clinker (Cement), Wikipedia, printed from the Internet on Aug. 23, 2013, available at http://en.wikipedia.org/wiki/Clinker_(cement).
Notice of Allowance for U.S. Appl. No. 13/662,111 dated Oct. 21, 2013.
Office Action for U.S. Appl. No. 13/180,238 dated Sep. 25, 2013.
Office Action for U.S. Appl. No. 13/851,925 dated Sep. 20, 2013.
Office Action for U.S. Appl. No. 13/767,710 dated Sep. 20, 2013.
Office Action for U.S. Appl. No. 13/477,777 dated Sep. 20, 2013.
International Search Report and Written Opinion for PCT/US2013/056719 dated Oct. 25, 2013.
Office Action for U.S. Appl. No. 13/955,516 dated Dec. 19, 2013.
USPTO Notice of Allowance for U.S. Appl. No. 13/180,238 dated Jan. 22, 2014.
USPTO Notice of Allowance for U.S. Appl. No. 13/851,925 dated Jan. 24, 2014.
USPTO Office Action for U.S. Appl. No. 13/851,475 dated Jan. 24, 2014.
USPTO Office Action for U.S. Appl. No. 13/620,013 dated Jan. 30, 2014.
USPTO Office Action for Application U.S. Appl. No. 14/079,421 dated Jan. 30, 2014.
International Search Report and Written Opinion for PCT/US2013/048092 dated Nov. 13, 2013.
International Search Report for PCT/US2013/026162 dated Aug. 26, 2013.
USPTO Office Action for U.S. Appl. No. 13/595,493 dated Jul. 23, 2014.
Chinese Application No. 200680042004.X dated Apr. 30, 2014 and Translation.
Chinese Reexamination of Application No. 200680042014.3 and Translation.
The Professional standard of the People's Republic of China, Rotary Kiln Dust Added to Cement, ZB Q 12001-84, dated Oct. 25, 1994 and translation.

(56) References Cited

OTHER PUBLICATIONS

International Search Report for International Application No. PCT/2013/057213 dated Nov. 18, 2013.

Toshinori Kojima et al., Reduction of CO2 Emission from Cement Manufacturing Process by Partly Substituting Silicate for Limestone, Geenhouse Gas Control Technologies, pp. 933-938, dated 1999.

* cited by examiner

METHODS AND COMPOSITIONS COMPRISING CEMENT KILN DUST HAVING AN ALTERED PARTICLE SIZE

CROSS-REFERENCE TO RELATED APPLICATIONS

This application is a divisional of U.S. patent application Ser. No. 13/477,777, entitled "Methods and Compositions Comprising Cement Kiln Dust Having an Altered Particle Size," filed on May 22, 2012, which is a divisional of U.S. patent application Ser. No. 13/399,913, entitled "Methods and Compositions Comprising Cement Kiln Dust Having an Altered Particle Size," filed on Feb. 17, 2012, which is a continuation-in-part of U.S. patent application Ser. No. 13/180,238, entitled "Settable Compositions Comprising Interground Perlite and Hydraulic Cement," filed on Jul. 11, 2011, which is a continuation-in-part of U.S. patent application Ser. No. 12/975,196, entitled "Settable Compositions Comprising Unexpanded Perlite and Methods of Cementing in Subterranean Formations," filed on Dec. 21, 2010, the entire disclosures of which are incorporated herein by reference. U.S. patent application Ser. No. 13/399,913, entitled "Methods and Compositions Comprising Cement Kiln Dust Having an Altered Particle Size," filed on Feb. 17, 2012, is also a continuation-in-part of U.S. patent application Ser. No. 12/895,436, entitled "Spacer Fluids Containing Cement Kiln Dust and Methods of Use, filed on Sep. 30, 2010, which is a continuation-in-part of U.S. patent application Ser. No. 12/264,010, entitled "Reduced Carbon Footprint Settable Compositions for Use in Subterranean Formations," filed on Nov. 3, 2008, which is a continuation-in-part of U.S. patent application Ser. No. 11/223,669, issued as U.S. Pat. No. 7,445,669, entitled "Settable Compositions Comprising Cement Kiln Dust and Additive(s)," filed Sep. 9, 2005, the entire disclosures of which are incorporated herein by reference.

BACKGROUND

In general, well treatments include a wide variety of methods that may be performed in oil, gas, geothermal and/or water wells, such as drilling, completion and workover methods. The drilling, completion and workover methods may include, but are not limited to, drilling, fracturing, acidizing, logging, cementing, gravel packing, perforating and conformance methods. Many of these well treatments are designed to enhance and/or facilitate the recovery of desirable fluids from a subterranean well.

In cementing methods, such as well construction and remedial cementing, settable compositions are commonly utilized. As used herein, the term "settable composition" refers to a composition(s) that hydraulically sets or otherwise develops compressive strength. Settable compositions may be used in primary cementing operations whereby pipe strings, such as casing and liners, are cemented in well bores. In performing primary cementing, a settable composition may be pumped into an annulus between a subterranean formation and the pipe string disposed in the subterranean formation. The settable composition should set in the annulus, thereby forming an annular sheath of hardened cement (e.g., a cement sheath) that should support and position the pipe string in the well bore and bond the exterior surface of the pipe string to the walls of the well bore. Settable compositions also may be used in remedial cementing methods, such as the placement of cement plugs, and in squeeze cementing for sealing voids in a pipe string, cement sheath, gravel pack, formation, and the like. Settable compositions may also be used in surface applications, for example, construction cementing.

Settable compositions for use in subterranean formations may further include Portland cement. Portland cement generally is a major component of the cost for the cement compositions. Other components may be included in the cement composition in addition to, or in place of, the Portland cement. Such components may include fly ash, slag, shale, zeolite, metakaolin, pumice, perlite, lime, silica, rice-hull ash, micro-fine cement, lime kiln dust, and the like. However, the operating conditions for wells are becoming more challenging and demanding, and the search for new materials continues to meet these challenges.

SUMMARY

An embodiment discloses a subterranean treatment method. The method may comprise introducing a treatment fluid into a subterranean formation, wherein the treatment fluid comprises cement kiln dust having a mean particle size that has been altered from its original size by grinding, separating, or a combination thereof Another embodiment discloses a subterranean treatment method. The method may comprise introducing a treatment fluid into a subterranean formation, wherein the treatment fluid comprises cement kiln dust having a mean particle size that has been reduced from its original size.

Another embodiment discloses a subterranean treatment method. The method may comprise introducing a treatment fluid into a subterranean formation, wherein the treatment fluid comprises cement kiln dust that has been ground.

Another embodiment discloses a method of preparing cement kiln dust. The method may comprise providing cement kiln dust having an original particle size. The method may further comprise altering the mean particle size of the cement kiln dust from the original particle size by grinding, separating, or a combination thereof Another embodiment discloses a well treatment fluid. The well treatment fluid may comprise cement kiln dust having a mean particle size that has been altered from its original particle size by grinding, separating, or a combination thereof Another embodiment discloses an additive for a settable composition. The additive may comprise cement kiln dust having a mean particle size that has been altered from its original particle size by grinding, separating, or a combination thereof The features and advantages of the present invention will be readily apparent to those skilled in the art. While numerous changes may be made by those skilled in the art, such changes are within the spirit of the invention.

DESCRIPTION OF PREFERRED EMBODIMENTS

Embodiments of the settable compositions of the present invention comprise cement kiln dust having a mean particle size that has been altered from its original size. The mean particle size of the cement kiln dust may be altered, for example, to selectively increase or decrease the mean particle size as desired for a particular application.

In embodiments of the present invention, altering the mean particle size of the cement kiln dust may improve one or more properties of the cement kiln dust, including the void-filling properties, gelation times, and compressive strengths. In some embodiments, the mean particle size of the cement kiln dust may be selectively altered based on the sizes of voids to be filled, which may be beneficial in remedial cementing methods, for example. For example, the mean particle size of the cement kiln dust may be optimized to more effectively fill voids in a pipe string, cement sheath, gravel pack, formation, or the like. In some embodiment, it is believed that altering the mean particle size of the cement kiln dust may be used to adjust the gelation time of compositions containing the cement kiln dust. In some embodiments, the mean particle size of the cement kiln dust may be reduced to provide an increase in compressive strength. For example, reducing mean particle size of the cement kiln dust to less than about 15 microns has been shown to provide unexpected increases in compressive strength for settable compositions to which the cement kiln dust may be added, especially when compared to use of the cement kiln dust prior to the size reduction.

In some embodiments, the mean particle size of the cement kiln dust may be reduced from its original size to provide an increase in compressive strength of at least about 5%, for example an increase in an amount in a range of at least about 5% to about 100%. In specific embodiments, the mean particle size of the cement kiln dust may be reduced to provide an increase in compressive strength of at least about 20%, at least about 40%, at least about 60%, at least about 80%, or at least about 100%. It should be understood that, as used herein, an increase in compressive strength for the cement kiln dust having a reduced mean particle size refers to a comparison of the compressive strength of a settable composition comprising the reduced particle size cement kiln dust to a settable composition comprising the original cement kiln dust prior to the particle size reduction. The compressive strength may be determined using either a destructive or non-destructive testing method. In some embodiments, the compressive strength tests may be performed in accordance with API RP Practice 10B-2, Recommended Practice for Testing Well Cements, First Edition, July 2005. For example, the 24-hour compressive strength for a settable composition comprising the cement kiln dust may be determined using an Ultrasonic Cement Analyzer from Farm Instruments, Houston, Texas, while maintained at 140° F. and 8,000 pounds per square inch ("psi"). In one particular example, the 24-hour compressive strengths may be determined for a settable composition having a density of about 12 pounds per gallon ("lb/gal").

Cement kiln dust, as that term is used herein, refers to a partially calcined kiln feed which is removed from the gas stream and collected, for example, in a dust collector during the manufacture of cement. The cement kiln dust generally may exhibit cementitious properties, in that it may set and harden in the presence of water. Usually, large quantities of cement kiln dust are collected in the production of cement that are commonly disposed of as waste. Disposal of the cement kiln dust can add undesirable costs to the manufacture of the cement, as well as the environmental concerns associated with its disposal. The chemical analysis of the cement kiln dust from various cement manufactures varies depending on a number of factors, including the particular kiln feed, the efficiencies of the cement production operation, and the associated dust collection systems. Cement kin dust generally may comprise a variety of oxides, such as $SiO_2$, $Al_2O_3$, $Fe_2O_3$, $CaO$, $MgO$, $SO_3$, $Na_2O$, and $K_2O$.

In accordance with present embodiments, the mean particle size of the cement kiln dust can be altered using any suitable technique, including, without limitation, grinding or separating to provide a material having an altered particle size. Separating the cement kiln dust may include sieving or any other suitable technique for separating the cement kiln dust to provide a mean particle size that has been altered from its original size. For example, sieving may be used to produce cement kiln dust having an increased or reduced mean particle size as desired for a particular application. By way of further example, grinding may be used to decrease the mean particle size of the cement kiln dust. Combinations of grinding and separating may be used in some embodiments. The term "ground" or "grinding" as used herein means using a grinder (e.g., ball mill, rod mill, etc.) to reduce the particle size of the specified component(s). An example of a suitable grinder is an 8000 Mixer/Mill® ball mill, available from SPEX Sample Prep. In some embodiments, the cement kiln dust may be ground for a time period in a range of from about 30 minutes to about 1 hour.

The mean particle size of the cement kiln dust can be altered to any size suitable for use in cementing operations. In some embodiments, the mean particle size of the cement kiln dust may be altered from its original particle size to have a mean particle size in a range of about 1 micron to about 350 microns. The mean particle size corresponds to d50 values as measured by particle size analyzers such as those manufactured by Malvern Instruments, Worcestershire, United Kingdom.

In some embodiments, the mean particle size of the cement kiln of the cement kiln dust may be increased from its original size. For example, the mean particle size of the cement kiln dust may be at least 5% greater than its original size. In some embodiments, at least a portion of the cement kiln dust may be increased to a size that is in a range of from about 5% to about 100% greater than its original size. In some embodiments, the mean particle size may be increased to a size ranging between any of and/or including any of about 5%, about 10%, about 15%, about 20%, about 25%, about 30%, about 35%, about 40%, about 45%, about 50%, about 55%, about 60%, about 65%, about 70%, about 75%, about 80%, about 90%, or about 95% greater than its of the original size.

In some embodiments, the mean particle size of the cement kiln dust may be reduced from its original size. For example, the mean particle size may be reduced in an amount sufficient to increase the compressive strength of the cement kiln dust. In some embodiments, the cement kiln dust may have a mean particle size that is at least 5% less than its original size. In some embodiments, at least a portion of the cement kiln dust may be reduced to have a mean particle size in a range of from about 5% to about 95% of its original size. For example, the mean particle size may be reduced to a size ranging between any of and/or including any of about 5%, about 10%, about 15%, about 20%, about 25%, about 30%, about 35%, about 40%, about 45%, about 50%, about 55%, about 60%, about 6%, about 70%, about 75%, about 80%, about 90%, or about 95% of its original size. By way of example, the reduced particle size cement kiln dust may have a mean particle size of less than about 15 microns. In some embodiments, the reduced particle size cement kiln dust may have a mean particle size of less than about 10 microns, less than about 5 microns, less than about 4 microns, less than about 3 microns, less than about 2 microns, or less than about 1 micron. In specific embodiments, the reduced particle size cement kiln dust may have a mean particle size in a range of from about 0.1 microns to about 15 microns, from about 0.1 microns to about 10 microns, or from about 1 micron to about 10 microns. One of ordinary skill in the art, with the benefit of this disclosure, should be able to select a particle size for the cement kiln dust suitable for a particular application.

The cement kiln dust having a particle size that has been altered may be included in the settable compositions in an amount sufficient to provide, for example, the desired compressive strength, gelation time, and the like. In some embodiments, the altered particle size cement kiln dust may be present in the settable compositions of the present invention in an amount in the range of from about 1% to 100% by weight of cementitious components ("% bwoc"). The term "cementitious components" refers to the components, or a combination thereof, of the settable compositions that hydraulically set, or otherwise harden, to develop compressive strength, including, for example, cement kiln dust, Portland cement, fly ash, natural pozzolans (e.g., pumicite), slag, lime, shale, and the like. The altered particle size cement kiln dust may be present in an amount, for example, ranging between any of and/or including any of about 5%, about 10%, about 15%, about 20%, about 25%, about 30%, about 35%, about 40%, about 45%, about 50%, about 55%, about 60%, about 65%, about 70%, about 75%, about 80%, about 90%, about 95%, or 100% bwoc. In specific embodiments, the altered particle size cement kiln dust may be present in the settable compositions in an amount in the range of from about 5% to 100% bwoc, from about 50% to 100% bwoc, or from about 75% to 100% bwoc. One of ordinary skill in the art, with the benefit of this disclosure, will recognize the appropriate amount of the cement kiln dust having a mean particle size that has been altered to include for a chosen application.

Embodiments of the settable compositions may further comprise one or more additional additives, including, but not limited to, hydraulic cement, fly ash, slag, shale, zeolite, metakaolin, pumice, perlite, lime, silica, rice-hull ash, microfine cement, lime kiln dust, and combinations thereof, and the like. In accordance with present embodiments, the cement kiln dust having a mean particle size that has been altered may be prepared by a process comprising intergrinding the cement kiln dust with one or more of the additional additives to a particular desired size. For example, the cement kiln dust and the one or more additional additives may be interground to a mean particle size of less than about 15 microns. In some embodiments, the cement kiln dust and the one or more additional additives may be interground to a mean particle size of less than about 10 microns, less than about 5 microns, less than about 4 microns, less than about 3 microns, less than about 2 microns, or less than about 1 micron. In specific embodiments, the cement kiln dust and the one or more additional additives may be interground to a mean particle size in a range from about 0.1 microns to about 15 microns, from about 0.1 microns to about 10 microns, or from about 1 micron to about 10 microns. One of ordinary skill in the art, with the benefit of this disclosure, should be able to select a particle size of the interground cement kiln dust and the one or more additional additives suitable for a particular application.

Hydraulic cement may be included in embodiments of the settable compositions of the present invention. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement, including Portland cements classified as Classes A, C, G and H cements according to American Petroleum Institute, API Specification for Materials and Testing for Well Cements, API Specification 10, Fifth Edition, Jul. 1, 1990. In addition, Portland cements suitable for use in embodiments the present invention may also include those classified as ASTM Type I, II, III, IV, or V. In some embodiments, the cement may be present in the settable compositions in an amount in the range of from about 0.1% to about 99% bwoc. For example, the cement may be present in an amount ranging between any of and/or including any of about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, or about 95% bwoc. One of ordinary skill in the art, with the benefit of this disclosure, will recognize the appropriate amount of the cement to include for a chosen application.

Fly ash may be included in embodiments of the settable compositions of the present invention. A variety of fly ashes may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime so that, when mixed with water, it sets to form a hardened mass. Class F fly ash generally does not contain sufficient lime, so an additional source of calcium ions may be required for the Class F fly ash to form a settable composition with water. In some embodiments, lime may be mixed with Class F fly ash in an amount in the range of about 0.1% to about 25% by weight of the fly ash. In some instances, the lime may be hydrated lime. Suitable examples of fly ash include, but are not limited to, POZ-MIX® A cement additive, available from Halliburton Energy Services, Inc., Duncan, Okl. Where present, the fly ash generally may be included in the settable compositions in an amount sufficient to provide the desired compressive strength, density, and/or cost. In some embodiments, the fly ash may be present in settable compositions of the present invention in an amount in the range of about 0.1% to about 75% bwoc. In some embodiments, the fly ash may be present in an amount ranging between any of and/or including any of about 10%, about 20%, about 30%, about 40%, about 50%, about 60%, or about 70% bwoc. One of ordinary skill in the art, with the benefit of this disclosure, will recognize the appropriate amount of the fly ash to include for a chosen application.

Slag may be included in embodiments of the settable compositions of the present invention. Slag generally does not contain sufficient basic material, so slag may be used with a base to produce a settable composition that may react with water to set to form a hardened mass. Examples of suitable sources of bases include, but are not limited to, sodium hydroxide, sodium bicarbonate, sodium carbonate, lime, and combinations thereof. Where present, the slag generally may be included in the settable compositions in an amount sufficient to provide the desired compressive strength, density, and/or cost. In some embodiments, the slag may be present in settable compositions of the present invention in an amount in the range of about 0.1% to about 75% bwoc. In some embodiments, the slag may be present in an amount ranging between any of and/or including any of about 10%, about 20%, about 30%, about 40%, about 50%, about 60%, or about 70% bwoc. One of ordinary skill in the art, with the benefit of this disclosure, will recognize the appropriate amount of the slag to include for a chosen application.

Shale may be included in embodiments of the settable compositions of the present invention. A variety of shales may be suitable, including those comprising silicon, aluminum, calcium, and/or magnesium. An example of a suitable shale comprises vitrified shale. Suitable examples of vitrified shale include, but are not limited to, PRESSUR-SEAL FINE LCM material and PRESSUR-SEAL COARSE LCM material, which are available from TXI Energy Services, Inc., Houston, Tex. Generally, the shale may have any particle size distribution as desired for a particular application. In certain embodiments, the shale may have a particle size distribution in the range of about 37 microns to about 4,750 microns.

Where present, the shale may be included in the settable compositions of the present invention in an amount sufficient to provide the desired compressive strength, density, and/or cost. In some embodiments, the shale may be present in settable compositions of the present invention in an amount in the range of about 0.1% to about 75% bwoc. In some embodiments, the shale may be present in an amount ranging between any of and/or including any of about 10%, about 20%, about 30%, about 40%, about 50%, about 60%, or about 70% bwoc. One of ordinary skill in the art, with the benefit of this disclosure, will recognize the appropriate amount of the shale to include for a chosen application.

Zeolite may be included in embodiments of the settable compositions of the present invention. Zeolites suitable for use typically may include porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite. Examples of suitable zeolites are described in more detail in U.S. Pat. No. 7,445,669. An example of a suitable source of zeolite is available from the C2C Zeolite Corporation of Calgary, Canada. In some embodiments, the zeolite may be present in settable compositions of the present invention in an amount in the range of about 0.1% to about 75% bwoc. In some embodiments, the zeolite may be present in an amount ranging between any of and/or including any of about 10%, about 20%, about 30%, about 40%, about 50%, about 60%, or about 70% bwoc. One of ordinary skill in the art, with the benefit of this disclosure, will recognize the appropriate amount of the zeolite to include for a chosen application.

Metakaolin may be included in embodiments of the settable compositions of the present invention. Generally, metakaolin is a white pozzolan that may be prepared by heating kaolin clay, for example, to temperatures in the range of about 600° C. to about 800° C. In some embodiments, the metakaolin may be present in settable compositions of the present invention in an amount in the range of about 0.1% to about 75% bwoc. In some embodiments, the metakaolin may be present in an amount ranging between any of and/or including any of about 10%, about 20%, about 30%, about 40%, about 50%, about 60%, or about 70% bwoc. One of ordinary skill in the art, with the benefit of this disclosure, will recognize the appropriate amount of the metakaolin to include for a chosen application.

Pumice may be included in embodiments of the settable compositions of the present invention. Generally, pumice is a volcanic rock that exhibits cementitious properties, in that it may set and harden in the presence of hydrated lime and water. Hydrated lime may be used in combination with the pumice, for example, to provide sufficient calcium ions for the pumicite to set. In some embodiments, the pumice may be present in settable compositions of the present invention in an amount in the range of about 0.1% to about 75% bwoc. In some embodiments, the pumice may be present in an amount ranging between any of and/or including any of about 10%, about 20%, about 30%, about 40%, about 50%, about 60%, or about 70% bwoc. One of ordinary skill in the art, with the benefit of this disclosure, will recognize the appropriate amount of the pumice to include for a chosen application.

Perlite may be included in embodiments of the settable compositions of the present invention. Perlite is an ore and generally refers to a naturally occurring volcanic, amorphous siliceous rock comprising mostly silicon dioxide and aluminum oxide. Perlite suitable for use in embodiments of the present invention includes expanded perlite and unexpanded perlite. In some embodiments, the perlite may comprise unexpanded perlite. The perlite may also be ground, for example. In some embodiments, the perlite may be present in settable compositions of the present invention in an amount in the range of about 0.1% to about 75% bwoc. In some embodiments, the perlite may be present in an amount ranging between any of and/or including any of about 10%, about 20%, about 30%, about 40%, about 50%, about 60%, or about 70% bwoc. One of ordinary skill in the art, with the benefit of this disclosure, will recognize the appropriate amount of the perlite to include for a chosen application.

Lime may be included in embodiments of the settable compositions of the present invention. In certain embodiments, the lime may be hydrated lime. The lime may be included in embodiments of the settable compositions, for example to, form a hydraulic composition with other components of the settable compositions, such as the pumice, fly ash, slag, and/or shale. Where present, the lime may be included in the settable compositions in an amount in the range of from about 0.1% to about 25% bwoc, for example. In some embodiments, the lime may be present in an amount ranging between any of and/or including any of about 5%, about 10%, about 15%, about 20%, or about 25% bwoc. One of ordinary skill in the art, with the benefit of this disclosure, will recognize the appropriate amount of the lime to include for a chosen application.

Silica may be included in embodiments of the settable compositions of the present invention. Silicas suitable for use typically may include amorphous silica, crystalline silica, or combinations thereof. Crystalline silica is a powder that may be included in embodiments of the settable compositions, for example, to prevent cement compressive strength retrogression. Amorphous silica is a powder that may be included in embodiments of the settable compositions as a lightweight filler and/or to increase cement compressive strength. In some embodiments, the silica may be present in settable compositions of the present invention in an amount in the range of about 0.1% to about 75% bwoc. In some embodiments, the silica may be present in an amount ranging between any of and/or including any of about 10%, about 20%, about 30%, about 40%, about 50%, about 60%, or about 70% bwoc. One of ordinary skill in the art, with the benefit of this disclosure, will recognize the appropriate amount of the silica to include for a chosen application.

Rice-hull ash may be included in embodiments of the settable compositions of the present invention. In general, rice-hull ash is the ash produced from the burning of rice hulls, which are the hard coverings of grains of rice, and may comprise primarily silica and carbon. In some embodiments, the rice-hull ash may be present in settable compositions of the present invention in an amount in the range of about 0.1% to about 75% bwoc. In some embodiments, the rice-hull ash may be present in an amount ranging between any of and/or including any of about 10%, about 20%, about 30%, about 40%, about 50%, about 60%, or about 70% bwoc. One of ordinary skill in the art, with the benefit of this disclosure, will recognize the appropriate amount of the rice-hull ash to include for a chosen application.

Micro-fine cement may be included in embodiments of the settable compositions of the present invention. As used herein, the term "micro-fine cement" refers to a cement having a mean particle size no larger than about 5 microns, for example, in a range of about 1 micron to about 5 microns. In some embodiments, the micro-fine cement may be present in settable compositions of the present invention in an amount in the range of about 0.1% to about 75% bwoc. In some embodiments, the micro-fine cement may be present in an amount ranging between any of and/or including any of about 10%, about 20%, about 30%, about 40%, about 50%, about 60%, or about 70% bwoc. One of ordinary skill in the art, with the benefit of this disclosure, will recognize the appropriate amount of the micro-fine cement to include for a chosen application.

Lime kiln dust may be included in embodiments of the settable compositions of the present invention. Lime kiln dust, as that term is used herein, refers to a product generated in the manufacture of lime. The lime kiln dust may be collected, for example, by dust control systems in the calcination of lime stone. In some embodiments, the lime kiln dust may be present in settable compositions of the present invention in an amount in the range of about 0.1% to about 75% bwoc. In some embodiments, the lime kiln dust may be present in an amount ranging between any of and/or including any of about 10%, about 20%, about 30%, about 40%, about 50%, about 60%, or about 70% bwoc. One of ordinary skill in the art, with the benefit of this disclosure, will recognize the appropriate amount of the lime kiln dust to include for a chosen application.

Embodiments of the settable compositions further may include water. The water that may be used in embodiments of the settable compositions include, for example, freshwater, saltwater (e.g., water containing one or more salts dissolved therein), brine (e.g., saturated saltwater produced from subterranean formations), seawater, or combinations thereof. Generally, the water may be from any source, provided that the water does not contain an excess of compounds that may undesirably affect other components in the settable composition. In some embodiments, the water may be included in an amount sufficient to form a pumpable slurry. In some embodiments, the water may be included in the settable compositions of the present invention in an amount in the range of about 40% to about 200% bwoc. For example, the water may be present in an amount ranging between any of and/or including any of about 50%, about 75%, about 100%, about 125%, about 150%, or about 175% bwoc. In specific embodiments, the water may be included in an amount in the range of about 40% to about 150% bwoc. One of ordinary skill in the art, with the benefit of this disclosure, will recognize the appropriate amount of water to include for a chosen application.

Optionally, other additional additives may be added to the settable compositions of the present invention as deemed appropriate by one skilled in the art, with the benefit of this disclosure. Examples of such additives include, but are not limited to, strength-retrogression additives, set accelerators, weighting agents, lightweight additives, gas-generating additives, mechanical-property-enhancing additives, lost-circulation materials, filtration-control additives, dispersants, fluid-loss-control additives, defoaming agents, foaming agents, oil-swellable particles, water-swellable particles, thixotropic additives, and combinations thereof. Specific examples of these, and other, additives include salts, fibers, hydratable clays, microspheres, elastomers, elastomeric particles, resins, latex, combinations thereof, and the like. A person having ordinary skill in the art, with the benefit of this disclosure, will readily be able to determine the type and amount of additive useful for a particular application and desired result. Embodiments of the settable compositions may be foamed and/or extended as desired by those of ordinary skill in the art.

The settable compositions of the present invention should have a density suitable for a particular application as desired by those of ordinary skill in the art, with the benefit of this disclosure. In some embodiments, the settable compositions may have a density in the range of from about 8 lb/gal to about 16 lb/gal. In other embodiments, the settable compositions may be foamed to a density in the range of from about 8 lb/gal to about 13 lb/gal.

While the settable compositions may be suitable for a number of different cementing operations, they may be particularly suitable for methods of cementing in a subterranean formation. For example, the settable compositions may be used in primary and remedial cementing operations in which the settable compositions may be introduced into a subterranean formation and allowed to set. As used herein, introducing the settable composition into a subterranean formation includes introduction into any portion of the subterranean formation, including, without limitation, into a well bore drilled into the subterranean formation, into a near well bore region surrounding the well bore, or into both.

In primary cementing embodiments, for example, a settable composition may be introduced into a space between a wall of a well bore and a conduit (e.g., pipe strings, liners) located in the well bore, the well bore penetrating the subterranean formation. The settable composition may be allowed to set to form an annular sheath of hardened cement in the space between the well bore wall and the conduit. Among other things, the set settable composition may form a barrier, preventing the migration of fluids in the well bore. The set settable composition also may, for example, support the conduit in the well bore.

In remedial cementing embodiments, a settable composition may be used, for example, in squeeze-cementing operations or in the placement of cement plugs. By way of example, the settable composition may be placed in a well bore to plug an opening, such as a void or crack, in the formation, in a gravel pack, in the conduit, in the cement sheath, and/or a microannulus between the cement sheath and the conduit.

While the preceding description is directed to the use of the cement kiln dust having a mean particle size that has been altered in subterranean cementing methods, it should be understood that embodiments of the present technique also encompasses the use of the altered particle size cement kiln dust in any of a variety of different subterranean treatments. For example, a subterranean treatment method may include providing a treatment fluid comprising the altered particle size cement kiln dust and introducing the treatment fluid into a subterranean formation. The cement kiln dust having a mean particle size that has been altered may be included in any of a number of well treatment fluids that may be used in subterranean treatments, including drilling fluids, completion fluids, spacer fluids, stimulation fluids, and well clean-up fluids. For example, a drilling fluid may comprise the reduced particle size cement kiln dust, wherein the drilling fluid may be circulated downwardly through a drill pipe and drill bit and then upwardly through the well bore to the surface. The drilling fluid used may be any number of fluids (gaseous or liquid) and mixtures of fluids and solids (such as solid suspensions, mixtures, and emulsions).

In some embodiments, a spacer fluid may comprise the cement kiln dust having a mean particle size that has been altered. Spacer fluids may be used, for example, in the displacement of fluids from well bore. In an embodiment, the fluid displaced by the spacer fluid comprises a drilling fluid. By way of example, the spacer fluid may be used to displace the drilling fluid from the well bore. The drilling fluid may include, for example, any number of fluids, such as solid suspensions, mixtures, and emulsions. Additional steps in embodiments of the method may comprise introducing a pipe string into the well bore, introducing a cement composition into the well bore with the spacer fluid separating the cement composition and the first fluid. In an embodiment, the cement composition may be allowed to set in the well bore. The cement composition may include, for example, cement and water.

Accordingly, embodiments of the present invention disclose methods and compositions that comprise cement kiln dust having a mean particle size that has been altered. There may be several potential advantages to the methods and compositions of the present invention, only some of which may be alluded to herein. One of the many potential advantages of embodiments of the present invention is that reducing the particle size of the cement kiln dust can result in increased compressive strength for the settable compositions after setting. For example, it has been shown that compositions with reduced particle size cement kiln dust have increased compressive strength as compared to use of the cement kiln dust prior to the size reduction. Another potential advantage is that altering the mean particle size of the cement kiln dust may impact the gelation time of compositions containing the cement kiln dust. Yet another potential advantage is that the mean particle size of the cement kiln dust may be selectively altered, for example, based on the size of voids. This could potentially result in more effective remedial cementing methods, as the particle size of the cement kiln dust has been optimized.

To facilitate a better understanding of the present invention, the following examples of certain aspects of some embodiments are given. In no way should the following examples be read to limit, or define, the scope of the invention.

EXAMPLE 1

The following series of tests was performed to evaluate the force resistance properties of settable compositions comprising cement kiln dust having a mean particle size that has been reduced. Two different sample settable compositions, designated Samples 1 and 2, were prepared by adding 250 grams of cement kiln dust to 267.3 grams of tap water while mixing in a Waring blender at 4,000 rpm for 15 seconds followed by mixing at 12,000 rpm for 35 seconds for each sample. Sample 1 contained unground cement kiln dust while the cement kiln dust included in Sample 2 was ground to a reduced particle size. Each of Samples 1 and 2 was then placed in a sealed cylindrical container, 2 inches in diameter by 4 inches in height. Each container was placed in a water bath at 140° F. and allowed to cure for 96 hours. Each container was then removed from the water bath, allowed to cool, and the cylindrical samples were demolded. The cylindrical samples were then placed in a Tinius Olsen tester, and the compressive strengths were determined. The compressive strength testing was performed in accordance with API RP Practice 10B-2, Recommended Practice for Testing Well Cements.

Sample 1 comprised water (106.93% bwoc) and cement kiln dust (100% bwoc). The cement kiln dust was unground and had a mean particle size of about 18.7 microns. Sample 1 had a density of 12 lb/gal.

Sample 2 comprised water (106.93% bwoc) and ground cement kiln dust (100% bwoc). The cement kiln dust in Sample 2 was ground from a mean particle size of 18.7 microns to a mean particle size of 5.9 microns using an 8000 Mixer/Mill® ball mill, available from SPEX Sample Prep. Sample 2 had a mean particle size reduction of 68.45%. The cement kiln dust was ground in the grinder for time period of about 30 minutes to about 1 hour. Sample 2 had a density of 12 lb/gal.

The results of the compressive strength testing are provided in Table 1 below. The data reported in the table below is the average of 3 tests for each of the sample settable compositions.

TABLE 1

| | | | Compressive Strength Tests | | | |
|---|---|---|---|---|---|---|
| Sample No. | Density (lb/gal) | Water (% bwoc) | CKD (% bwoc) | CKD Particle Size (micron) | Temp. (° F.) | 96-Hr Comp. Strength (psi) |
| 1 | 12 | 106.93 | 100 | 18.7 | 140 | 64.3 |
| 2 | 12 | 106.93 | 100 | 5.9 | 140 | 169.5 |

Example 1 thus indicates that reducing the particle size of the cement kiln dust may increase the compressive strength of the settable compositions as compared to unground cement kiln dust. At 140° F., for example, Sample 2 with cement kiln dust ground to a mean particle size of 5.9 microns had a 96-hour compressive strength of 169.5 psi as compared to a 96-hour compressive strength of 64.3 psi for Sample 1 with unground cement kiln dust.

EXAMPLE 2

An additional series of tests was performed to further evaluate the force resistance properties of settable compositions comprising cement kiln dust have a mean particle size that has been reduced. Two different sample settable compositions, designated Samples 3 and 4, were prepared by adding 200 grams of cement kiln dust to 213.9 grams of tap water while mixing in a Waring blender at 4,000 rpm for 15 seconds followed by mixing at 12,000 rpm for 35 seconds for each sample. Sample 3 contained unground cement kiln dust while the cement kiln dust in Sample 4 was ground to a reduced particle. Each of the samples was then placed in an Ultrasonic Cement Analyzer ("UCA") from Fann Instruments, Houston, Tex. In the UCA, the compressive strength of each sample was determined over time at 140° F. and 8,000 psi. The compressive strength testing was performed in accordance with API RP Practice 10B-2, Recommended Practice for Testing Well Cements.

Sample 3 comprised water (106.93% bwoc) and cement kiln dust (100% bwoc). The cement kiln dust was unground and had a mean particle size of about 18.7 microns. Sample 3 had a density of 12 lb/gal.

Sample 4 comprised water (106.93% bwoc) and ground cement kiln dust (100% bwoc). The cement kiln dust in Sample 4 was ground from a mean particle size of 18.7 microns to a mean particle size of 9.7 microns using an 8000 Mixer/Mill® ball mill, available from SPEX Sample Prep. Sample 4 had a mean particle size reduction of 48.13%. The cement kiln dust was ground in the grinder for time period of about 30 minutes to about 1 hour. Sample 4 had a density of 12 lb/gal.

The results of the compressive strength testing are provided in Table 2 below. The data reported in the table below is compressive strengths reported by the UCA at 12 hours and 24 hours.

TABLE 2

| | | | | UCA Compressive Strength Tests | | | |
|---|---|---|---|---|---|---|---|
| Sample No. | Density (lb/gal) | Water (% bwoc) | CKD (% bwoc) | CKD Particle Size (micron) | Temp. (° F.) | 12-Hr Comp. Strength (psi) | 24-Hr Comp. Strength (psi) |
| 3 | 12 | 106.93 | 100 | 18.7 | 140 | 153 | 166 |
| 4 | 12 | 106.93 | 100 | 9.7 | 140 | 298 | 326 |

Example 2 thus indicates that reducing the particle size of the cement kiln dust may increase the compressive strength of the settable compositions as compared to unground cement kiln dust. At 140° F., for example, Sample 4 with cement kiln dust ground to a mean particle size of 9.7 microns had a 12-hour compressive strength of 298 psi as compared to a 12-hour compressive strength of 153 psi for Sample 3 with unground cement kiln dust.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recite. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method comprising:
   individually grinding a cementitious component consisting essentially of a partially calcined kiln feed removed from a gas stream, wherein the partially calcined kiln feed has an original mean particle size, wherein the cementitious component was ground to reduce the original mean particle size of the partially calcined kiln feed to a size of about 15 microns or less, wherein the original mean particle size of the partially calcined kiln feed was reduced by about 25% or more by the grinding, and wherein the partially calcined kiln feed comprises $SiO_2$, $Al_2O_3$, $Fe_2O_3$, CaO, MgO, $SO_3$, $Na_2O$, and $K_2O$; and
   mixing the ground partially calcined kiln feed with a hydraulic cement.

2. The method of claim 1, wherein the original mean particle size of the partially calcined kiln feed is reduced by about 50% or more by the grinding.

3. The method of claim 1, wherein the original mean particle size of the partially calcined kiln feed is reduced to a range of from about 1 micron to about 10 microns.

4. The method of claim 1, wherein the settable composition further comprises an additive selected from the group consisting of fly ash, slag, shale, zeolite, metakaolin, pumice, perlite, lime, silica, rice-hull ash, micro-fine cement, and any combination thereof.

5. The method of claim 1, further comprising using the partially calcined kiln feed in a settable composition comprising an additive selected from the group consisting of a set retarding additive, a strength-retrogression additive, a set accelerator, a weighting agent, a lightweight additive, a gas-generating additive, a mechanical-property-enhancing additive, a lost-circulation material, a filtration-control additive, a dispersant, a fluid-loss-control additive, a defoaming agent, a foaming agent, an oil-swellable particle, a water-swellable particle, a thixotropic additive, and any combination thereof.

6. The method of claim 1, further comprising introducing a settable composition comprising the partially calcined kiln feed into a subterranean formation.

7. The method of claim 6, wherein the settable composition is used in primary cementing.

8. The method of claim 6, wherein the settable composition is used in remedial cementing.

9. The method of claim 6, wherein the partially calcined kiln feed comprises cement kiln dust and is present in the settable composition in an amount in a range of from about 1% to about 100% by weight of the total amount of cementitious components present in the settable composition.

10. The method of claim 6, wherein the partially calcined kiln feed comprises cement kiln dust and is present in the settable composition in an amount in a range of from about 80% to about 100% by weight of the total amount of cementitious components present in the settable composition.

11. The method of claim 1, wherein the mean particle size of the partially calcined kiln feed has been reduced in an amount sufficient to provide an increase in 24-hour compressive strength of at least about 5% for a settable composition comprising the partially calcined kiln feed, the 24-hour compressive strength being measured using an Ultrasonic Cement Analyzer while maintained at 140° F. and 3,000 psi.

12. The method of claim 1, wherein the mean particle size of the partially calcined kiln feed has been reduced in an amount sufficient to provide an increase in 24-hour compressive strength of at least about 20% for a settable composition comprising the partially calcined kiln feed, the 24-hour compressive strength being measured using an Ultrasonic Cement Analyzer while maintained at 140° F. and 3,000 psi.

13. The method of claim 1, wherein the mean particle size of the partially calcined kiln feed has been reduced in an amount sufficient to provide an increase in 24-hour compressive strength of at least about 100% for a settable composition comprising the partially calcined kiln feed, the 24-hour compressive strength being measured using an Ultrasonic Cement Analyzer while maintained at 140° F. and 3,000 psi.

14. A method of preparing a partially calcined kiln feed removed from a gas stream comprising:
   providing the partially calcined kiln feed removed from a gas stream, wherein the partially calcined kiln feed has an original mean particle size and comprises SiO2, Al2O3, Fe2O3, CaO, MgO, SO3, Na2O, and K2O; and
   intergrinding the partially calcined kiln feed with one or more additives to reduce the original mean particle size of the partially calcined kiln feed to a size of about 15 microns or less, wherein the original mean particle size of the partially calcined kiln feed was reduced by at least about 25% by the grinding, wherein the partially calcined kiln feed is present in an amount of about 55% or more by weight of a total amount of the partially calcined kiln feed and the one or more additives.

15. The method of claim 14, wherein the reduced mean particle size of the partially calcined kiln feed is in a range of from about 1 micron to about 10 microns.

16. The method of claim 14, wherein the partially calcined kiln feed is from the manufacture of cement.

17. The method of claim 14, further comprising using the partially calcined kiln feed in a settable composition comprising an additive selected from the group consisting of hydraulic cement, fly ash, slag, shale, zeolite, metakaolin, pumice, perlite, lime, silica, rice-hull ash, micro-fine cement, and any combination thereof.

18. The method of claim 14, further comprising using the partially calcined kiln feed in a settable composition comprising an additive selected from the group consisting of a set retarding additive, a strength-retrogression additive, a set accelerator, a weighting agent, a lightweight additive, a gas-generating additive, a mechanical-property-enhancing additive, a lost-circulation material, a filtration-control additive, a dispersant, a fluid-loss-control additive, a defoaming agent, a foaming agent, an oil-swellable particle, a water-swellable particle, a thixotropic additive, and any combination thereof.

19. The method of claim 14, further comprising introducing a settable composition comprising the partially calcined kiln feed into a subterranean formation.

20. The method of claim 19, wherein the settable composition is used in primary cementing.

21. The method of claim 19, wherein the settable composition is used in remedial cementing.

22. The method of claim 19, wherein the partially calcined kiln feed comprises cement kiln dust.

23. The method of claim 19 wherein the partially calcined kiln feed comprises cement kiln dust and is present in the settable composition in an amount in a range of from about 80% to about 100% by weight of the total amount of cementitious components present in the settable composition.

24. The method of claim 14, wherein the mean particle size of the partially calcined kiln feed has been reduced in an amount sufficient to provide an increase in 24-hour compressive strength of at least about5% for a settable composition comprising the partially calcined kiln feed, the 24-hour compressive strength being measured using an Ultrasonic Cement Analyzer while maintained at 140° F. and 3,000 psi.

25. The method of claim 14, wherein the mean particle size of the partially calcined kiln feed has been reduced in an amount sufficient to provide an increase in 24-hour compressive strength of at least about 20% for a settable composition comprising the partially calcined kiln feed, the 24-hour compressive strength being measured using an Ultrasonic Cement Analyzer while maintained at 140° F. and 3,000 psi.

26. The method of claim 14, wherein the mean particle size of the cement kiln dust has been reduced in an amount sufficient to provide an increase in 24-hour compressive strength of at least about 100% for a settable composition comprising the partially calcined kiln feed, the 24-hour compressive strength being measured using an Ultrasonic Cement Analyzer while maintained at 140° F. and 3,000 psi.

27. A method of preparing a partially calcined kiln feed removed from a gas stream comprising:
   providing the partially calcined kiln feed removed from a gas stream, wherein the partially calcined kiln feed has an original mean particle size and comprises SiO2, Al2O3, Fe2O3, CaO, MgO, SO3, Na2O, and K2O; and
   intergrinding the partially calcined kiln feed with at least one additive selected from the group consisting of pumice, perlite, and a combination thereof to reduce the original mean particle size of the partially calcined kiln feed to a size of about 15 microns or less, wherein the original mean particle size of the partially calcined kiln feed was reduced by about 25% or more by the grinding, wherein the partially calcined kiln feed is present in an amount of about 55% or more by weight of a total amount of the partially calcined kiln feed and the one or more additives.

28. The method of claim 27, wherein the original mean particle size of the partially calcined kiln feed is reduced by about 50% or more by the grinding.

29. The method of claim 27, wherein the original mean particle size of the partially calcined kiln feed is reduced to a range of from about 1 micron to about 10 microns.

30. The method of claim 27, further comprising using the partially calcined kiln feed in a settable composition comprising an additive selected from the group consisting of a set retarding additive, a strength-retrogression additive, a set accelerator, a weighting agent, a lightweight additive, a gas-generating additive, a mechanical-property-enhancing additive, a lost-circulation material, a filtration-control additive, a dispersant, a fluid-loss-control additive, a defoaming agent, a foaming agent, an oil-swellable particle, a water-swellable particle, a thixotropic additive, and any combination thereof.

* * * * *